Figure 1:
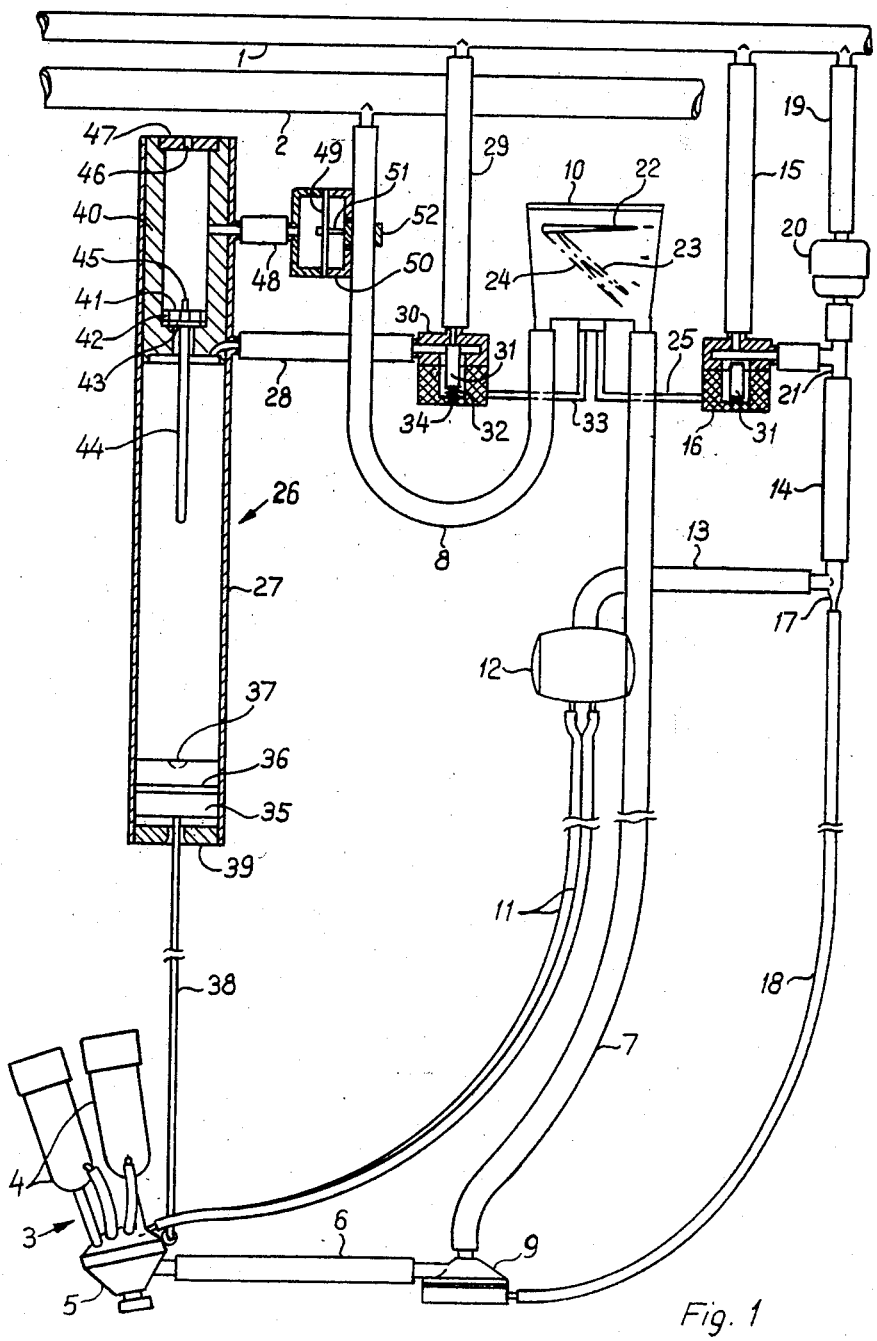

United States Patent
Tonelli

[15] 3,690,300
[45] Sept. 12, 1972

[54] APPARATUS FOR REMOVING TEAT CUPS

[72] Inventor: Guido Antonio Tonelli, Sodertalje, Sweden

[73] Assignee: Alfa-Laval AB, Tumba, Sweden

[22] Filed: Nov. 12, 1970

[21] Appl. No.: 88,877

[30] Foreign Application Priority Data
Nov. 17, 1969 Sweden ............... 15727/69

[52] U.S. Cl. ........................ 119/14.08, 119/14.14
[51] Int. Cl. ........................................... A01j 05/04
[58] Field of Search...119/14.01, 14.08, 14.11, 14.14

[56] References Cited
UNITED STATES PATENTS

| | | |
|---|---|---|
| 3,556,053 | 1/1971 | Padman et al. .......... 119/14.08 |
| 3,246,631 | 4/1966 | Holm ................... 119/14.08 X |
| 3,603,292 | 9/1971 | Finch ..................... 119/14.08 |

*Primary Examiner*—Hugh R. Chamblee
*Attorney*—Davis, Hoxie, Faithfull & Hapgood

[57] ABSTRACT

A milk flow indicator is inserted in the milk pipeline between the milk claw and a collection place for the milk; and upon cessation of the milk flow, the indicator actuates a means for reducing the vacuum in the milk claw and also admitting atmospheric air into the claw, prior to removal of the teat cup cluster. After the vacuum reduction, the indicator preferably actuates means for pulling the teat cups from the teats so that such pulling effects an appreciable admission of air into the teat cup liners.

3 Claims, 2 Drawing Figures

INVENTOR.
GUIDO ANTONIO TONELLI

APPARATUS FOR REMOVING TEAT CUPS

The present invention relates to apparatus for use in automatically removing a teat cup cluster from an udder and comprising a milk flow indicator inserted in the milk pipeline between the milk claw and a collection place for the milk.

In a known apparatus of this kind, the teat cups are pulled from the teats while full milking vacuum is still prevailing in the interior of the teat cup liners. Such a pulling of the test cups from the teats injures the latter, and at the same time the milk content of the milk claw and of a certain part of the milk pipeline flows out onto the stall floor. The latter is due to the manner in which the milk claw is hung, when being pulled off while being lifted, while at the same time the vacuum connection with the interior of the teat cup liners is closed.

The present invention has for its object to avoid these disadvantages and is characterized in that a milk flow indicator is arranged to actuate a means, when the milk flow ceases, so as to reduce the vacuum in the milk claw and admit atmospheric air into the latter, prior to the removal of the teat cup cluster. More exactly, the vacuum is reduced so much that the teat cups barely remain hanging at the teats and consequently can easily be pulled off the teats without injuring the latter. In this connection, the air admission flushes away toward the milk collection place all that milk which otherwise would flow out from the milk claw when the teat cup cluster is removed from the udder.

According to one embodiment of the invention, the milk flow indicator is arranged to actuate a means operable, after the vacuum reduction, to pull the teat cups from the teats so that said pulling effects an appreciable air admission into the teat cup liners, thereby causing said flushing away of the milk.

According to another embodiment, which is more indulgent to the teats, the indicator is arranged to actuate a valve, when the milk flow ceases, so as to admit air into the milk claw. By providing such a valve, not only is the flushing effect achieved but also the air admission causes that vacuum reduction which should take place prior to the removal of the teat cup cluster.

Of course, atmospheric air is not allowed to flow into the milk pipeline in a larger quantity than that necessary for flushing away the milk, on one hand for hygienic reasons so that dirt is not sucked into the milk pipeline after the teat cup cluster has been removed from the udder, and on the other hand so as to avoid loading the vacuum pump unnecessarily. To this end, and additional embodiment of the invention is characterized by a means which, when the teat cup cluster is removed, is actuated so as to interrupt the connection of the vacuum source with the interior of the teat cup liners.

Figure 2:
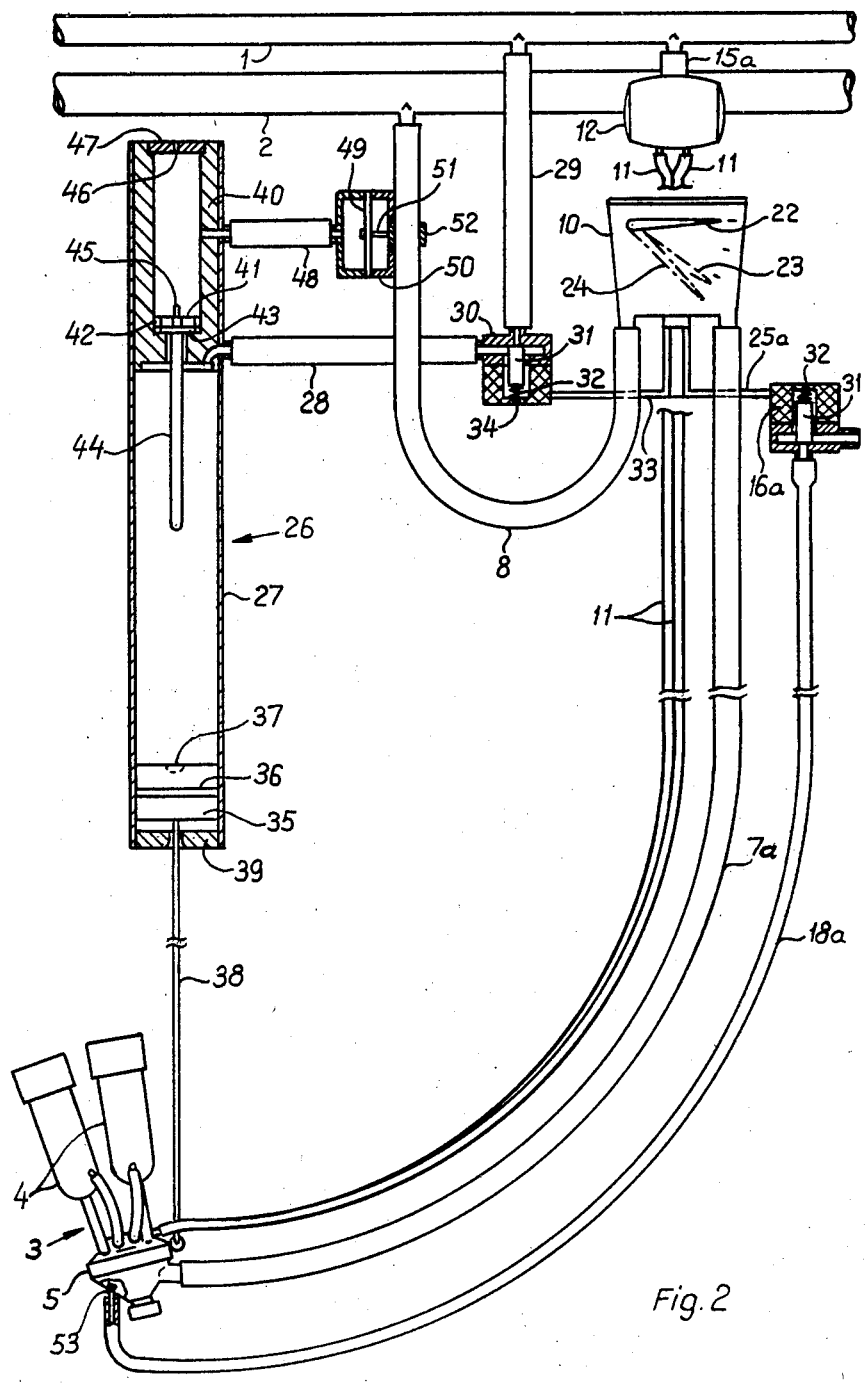

The invention is described more in detail below with reference to the accompanying drawings, in which FIGS. 1 and 2 are schematic views of two different embodiments of the new apparatus. In the two figures, corresponding details have the same reference numerals.

As shown in FIG. 1, the apparatus comprises a pure vacuum pipeline 1 and a milk conveying pipeline 2, the latter being kept under vacuum and leading milk to a collection container (not shown). A teat cup cluster 3 comprises teat cups 4 with appurtenant hoses and a milk claw 5. The latter is connected by means of hoses 6, 7 and 8 to the milk pipeline 2. In the flow path formed by these three hoses, there is inserted a milking vacuum stabilizer 9 (i.e., a valve which has an equalizing effect on the milking vacuum) and also a milk flow indicator 10. Two hoses 11 are each connected to the pulsation spaces in a pair of teat cups 4, and by means of these hoses a pulsator 12 alternately generates vacuum and atmospheric pressure in said pulsation spaces. The pulsator 12 is in turn connected to the vacuum pipeline 1 by means of hoses 13, 14 and 15 as well as a magnetic valve 16. A T tube 17 is inserted in the flow path formed by these hoses, and a hose 18 leading to the stabilizer 9 is connected to this T tube. Between the vacuum pipeline 1 and the hose 14 there is also inserted a hose 19, in which a vacuum reduction valve 20 is inserted. A T tube 21 provides for the two branch connections from the upper end of hose 14.

As shown in FIG. 1, the milking system is in the condition when milking takes place with full flow. The indicator 10 is illustrated as including a chamber containing a float (not shown) actuated by changes in the milk level. The indicator has a pointer which assumes the full line position with full milk flow. A position 23 (shown with broken lines) indicates an appreciably reduced milk flow, and another position 24 (shown with broken lines) indicates ceasing milk flow. An electrical operative connection between the indicator and the magnetic valve 16 is shown at 25.

A means for removing the teat cup cluster is indicated at 26 and comprises a vertical cylinder 27 whose interior communicates with the vacuum pipeline 1 via hoses 28 and 29 as well as a magnetic valve 30 connected between said hoses. Each of the two valves 16 and 30 contains a cylindrical valve body 31 urged upwardly by a spring 32. The magnetic valve 30 is operatively connected at 33 to the indicator 10 and has an opening 34 for the admission of atmospheric air. A piston 35, which has a gasket 35 and a pit 37 provided in its upper side, operates in the cylinder 27. A cord 38, which passes through the bottom 39 of the cylinder, is fixed to the milk claw 5. In the top of the cylinder there is provided a cylindrical insert 40 having a reduced inner diameter. A piston 41, having recesses 42 in its edge and a packing 43 on its underside, operates in the cylinder 40. A rod 44, whose lower end fits in the pit 37, is fixed to the underside of the piston 41 and hangs vertically downward; and on the upper side of the piston 41 is a pin 45 directed upward and having a good fit in a hole 46 in a cover 47 of the cylinder 40. The interior of the latter communicates by means of a hose 48 with a chamber 50, divided by a diaphragm 49 and functioning as a hose clip. The diaphragm is connected by means of a pin 51 to a bow 52 surrounding the hose 8.

In the operation of the apparatus, when the milk flow is full, the hose 8 is quite open so that the interior of the test cup liners is kept under full milking vacuum, and then the indicator pointer takes the position 22. The indicator 10 at the same time keeps the electrical circuit of the magnetic valve 16 closed and the electrical circuit of the magnetic valve 30 open. This means that the coil magnet of the valve 16 keeps the body 31 pulled downward against the action of the spring 32 and the suction action from the hose 15, so that the valve 16 is kept open. The valve 30, on the other hand, is kept closed through the action of the spring 32 and the suction from the hose 29. Air flows from the hole 34 through the hose 28 into the cylinder 27, so that atmospheric pressure prevails in the latter. At the same time, atmospheric pressure prevails within the cylinder 40 due to the hole 45. Thus, the piston 35 is in its bottom position and enables the positioning of the teat cup cluster on the udder. Also, since the valve 16 is kept open, the pulsator 12 and the pulsation spaces of the teat cups operate with full vacuum.

When the milk flow has decreased appreciably so that the indicator pointer reaches the position 23, the electrical circuit of the magnetic valve 16 is broken, whereby the body 31 will close the opening of the hose 15. The vacuum connection 19-20 then comes into operation so that the vacuum in the pulsator 12 (and consequently that in the pulsation spaces of the teat cups) is reduced. Simultaneously, the vacuum in the hose 18 is reduced and influences the stabilizer 9 so that it throttles the connection between the hoses 6 and 7. This means that the vacuum in the interior of the teat cup liners is also reduced, preferably to such a degree that the teat cups barely remain hanging at the teats. When the milk flow has essentially ceased and the indicator pointer has reached the position 24, the electrical circuit of the magnetic valve 30 is closed, so that the cylinder 27 is put under vacuum via the hoses 28 and 29. In the beginning, an air admission into the cylinder 27 is prevented by the packing 43. The piston 35 is the sucked upwardly so that the cord 38 pulls the teat cup cluster 3 from the udder. Air then flows into the teat cup liners ad flushes through the entire milk flow path to the milk pipeline 2, so that the milk in this milk flow path is emptied. Finally, the piston 35 pushes against the rod 44 and lifts the latter upward, thereby displacing the piston 41 upward. This movement is facilitated by the recesses 42 through which the air present in the cylinder 40 is sucket out, the hole 46 being so small that atmospheric air flows only slowly into the cylinder 40. The hole 46 is closed by the pin 45 in the upper position of the piston 41. When the cylinder 40 has been put under vacuum, the diaphragm 49 in the chamber 50 and also the bow 52 are drawn to the left, so that the hose 8 is compressed. Thus, additional air admission into the milk pipeline 2 is prevented after the desired flushing away of milk has been attained.

In the embodiment shown in FIG. 2, details having a replacing function in relation to the embodiment according to FIG. 1 are designated by the suffix *a*. Thus, an air admission valve 16*a* replaces the valves 9, 16 and 20 in FIG. 1, as regards the vacuum reduction. The valve 16*a* has the same design as the valve 16. For the rest, the difference is that the pulsator 12 is always kept under full vacuum and that the electrical circuit of the valve 16*a* is broken when the milk flow is full, i.e., when the indicator pointer is in the position 22. The valve body 31 in the valve 16*a* then closes an air admission through the valve, especially through suction action from the vacuum prevailing in the hose 18*a*. A non-return valve 53, pre-set by a spring in the milk claw 5, prevents inflow of milk to the hose 18*a*.

The embodiment according to FIG. 2 operates so that the electrical circuit of the magnetic valve 16*a* is closed when the indicator pointer moves from the position 22 for full milk flow and reaches the position 23 for appreciably decreasing milk flow. The valve body of this magnetic valve is pulled upward and atmospheric air flows through the valve, the hose 18*a* and the non-return valve 53 into the milk claw 5 in such a quantity that the teat cups 4 barely remain hanging at the teats. In other words, this action reduces the vacuum in the milk flow path from the interior of the teat cup liners to the milk pipeline 2. Then, when the indicator pointer reaches the position 24, after the milk remaining in the indicator 10 has been flushed away by the passing air, the same operations take place as those described in connection with the embodiment according to FIG. 1, i.e., the teat cup cluster is pulled off the udder and the hose 8 is compressed by the hose clip 49-52.

I claim:

1. In combination with a vacuum milking system including a teat cup cluster having a milk claw, and a milk pipeline leading from said claw for conducting milk under vacuum to a collection place, apparatus for use in automatically removing the teat cup cluster from an udder and comprising a milk flow indicator inserted in the milk pipeline, means operable by said indicator, in response to a substantial reduction of milk flow in said pipeline, for supplying atmospheric air directly to the milk claw and thereby reducing the vacuum in said milk claw prior to said removal of the teat cup cluster, and means rendered inoperable during said vacuum reduction and operable by said indicator in response to cessation of said milk flow for removing said teat cup cluster from said udder.

2. The combination according to claim 1, in which said vacuum reducing means include a valve operable by said indicator, in response to said reduction of milk flow, to admit air into the milk claw.

3. The combination according to claim 1, comprising also means operable in response to said removal of the teat cup cluster to interrupt the vacuum connection with the interior of the teat cup liners.

* * * * *